Patented Jan. 29, 1924.

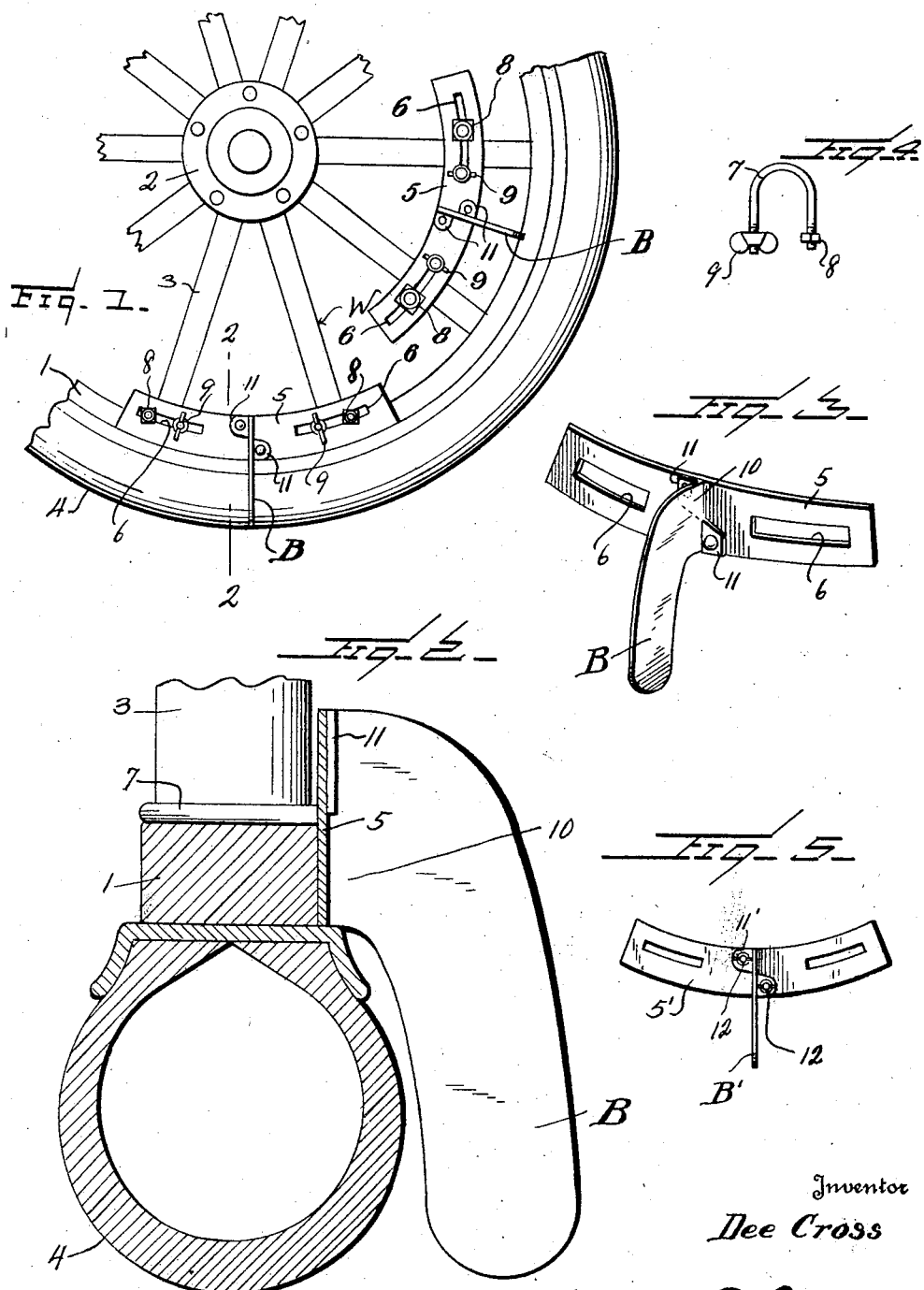

1,482,349

UNITED STATES PATENT OFFICE.

DEE CROSS, OF HOUSTON, ARKANSAS.

NONSLIPPING ATTACHMENT.

Application filed January 13, 1923. Serial No. 612,400.

*To all whom it may concern:*

Be it known that I, DEE CROSS, a citizen of the United States, residing at Houston, in the county of Perry and State of Arkansas, have invented certain new and useful Improvements in Nonslipping Attachments, of which the following is a specification, reference being had to the accompanying drawings.

This invention relates to non-slipping attachments and it is an object of the invention to provide a novel and improved attachment of this general character adapted to be connected to the drive wheel of a motor driven vehicle to prevent slipping of the wheel in sand, mud or the like.

Another object of the invention is to provide a novel and improved attachment of this general character which can be readily adjusted into an inoperative or non-effecting position and particularly when the vehicle with which it is employed is adapted to travel over city streets or other roadways in connection with which the use of such attachments or similar devices may be prohibited.

The invention consists in the details of construction and in the combination and arrangement of the several parts of my improved non-slipping attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in elevation illustrating a non-slipping attachment constructed in accordance with an embodiment of my invention and in applied position, both operatively and inoperatively;

Figure 2 is an enlarged sectional view taken substantially on the line 2—2 of Figure 1;

Figure 3 is a view in perspective of my improved attachment unapplied;

Figure 4 is an elevational view of one of the U-bolts as herein employed together with the nuts associated therewith; and Figure 5 is an elevational view of a modified form of the device as illustrated in Figure 3.

While any one of the preferred forms of my improved attachment may be employed in connection with a wheel for the purpose of disclosure I am only describing and illustrating one of such attachments.

As disclosed in the accompanying drawings W denotes a wheel including the felly 1 connected to the hub 2 by the spokes 3 and mounted upon the felly 1 in any preferred manner is a tire 4. The wheel W is preferably one of the drive wheels of a motor driven vehicle.

My improved attachment comprises an arcuate flat plate 5 of a length in excess of the distance between two adjacent spokes 3 at the felly 1 whereby the plate 5 when applied bridges such space and has firm contact with the adjacent side face of the felly 1. The plate 5 at each of its end portions is provided with longitudinally disposed slots 6 through each of which extend the extremities of a U-bolt 7, said bolt straddling over one of the spokes 3. One end portion of the U-bolt 7 has threaded thereon a conventional nut 8 while the opposite end portion has threaded thereon a wing nut 9. The nuts 8 and 9 in connection with the U-bolt 7 serve to effectively clamp the plate 5 to a spoke 3.

The loosening of the nut 9 of each of the U-bolts 7 readily permits the plate 5 to be moved inwardly of the associated spoke 3 or in the reverse direction, the slots 6 permitting the bolts 7 to have requisite movement relative to the plate 5 as occasioned by the relative convergence of the spokes.

B denotes a flat blade of steel or other preferred material provided at one end portion with a lateral extension 10. The extension 10 at its inner marginal portion is provided with oppositely directed wings 11 adapted to be riveted or otherwise secured to the plate 5 whereby the blade B is effectively held to said plate. It is preferred that the blade B be positioned at the central portion of the plate 5 and with the flat faces of said blade subsantially perpendicular to the outer or adjacent face of the plate 5. The blade B extends beyond the outer edge of the plate 5 and is of such a length as to terminate adjacent to the tread portion of the tire 4 when the plate 5 is at substantially the limit of its outward movement relative to the spokes 3.

The extension 10 of the blade B is of sufficient length to maintain the blade B in a position out of contact with the tire 4 or otherwise interfering with said tire.

While I do not wish to be understood as limiting myself to the dimensions of any of the parts of my improved attachment, I find it in practice best to have the blade B of such a length as to have a maximum extent of one-eighth of an inch inwardly of the tread of the tire 4.

In the embodiment of my invention illustrated in Figure 5 the wings 11' of the blade B' are held to the plate 5' by the coacting nuts and bolts generally indicated at 12. By this means the blade B' may be readily removed for repairs or replacement.

From the foregoing description it is thought to be obvious that a non-slipping attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An attachment for a spoked wheel comprising a connecting plate adapted to be positioned to one side of the felly of the wheel and of a length to bridge the space between a pair of adjacent spokes, the opposite ends of the plate being provided with longitudinally disposed slots, clamping means extending through each of the slots and in engagement with the adjacent spoke, and a blade extending outwardly from the plate at a point between the slots, said blade being arranged to one side of the plate with the faces thereof substantially perpendicular to the adjacent face of the plate.

2. An attachment for a spoked wheel comprising a plate adapted to be positioned to one side of a pair of adjacent spokes and of a length to bridge the space therebetween, said plate being provided with spaced slots, clamping means extending through each of the slots and engageable with the spoke adjacent thereto, a blade provided at one end portion with a lateral extension, the free end of said extension being provided with oppositely directed wings, means for securing the wings to the face of the plate, whereby the blade extends beyond the side of the plate, said blade being flat with its faces substantially perpendicular to the adjacent face of the plate.

In testimony whereof I hereunto affix my signature.

DEE CROSS.